United States Patent [19]

Beuch

[11] 4,398,336
[45] Aug. 16, 1983

[54] METHOD OF INHIBITING KINKING AND TWISTING OF A CABLE RELATIVE TO AN ANCHOR

[76] Inventor: Donald R. Beuch, 138 S. 211 East, Draper, Utah 84020

[21] Appl. No.: 225,928

[22] Filed: Jan. 19, 1981

Related U.S. Application Data

[62] Division of Ser. No. 7,455, Jan. 29, 1979, abandoned.

[51] Int. Cl.³ .............................................. B23P 19/04
[52] U.S. Cl. ........................................ 29/433; 29/463; 29/517; 24/115 A; 403/210
[58] Field of Search ................ 29/463, 433, 509, 517, 29/525; 242/71.8; 24/115 K, 115 A, 115 R, 132 AA; 114/114; 403/210, 211, 359, 212, 375

[56] References Cited

U.S. PATENT DOCUMENTS

| | | | |
|---|---|---|---|
| 857,717 | 6/1907 | Brown | 403/210 |
| 2,312,471 | 3/1943 | Low | 403/375 X |
| 2,575,025 | 11/1951 | Mihalyi | 242/71.8 |
| 2,647,943 | 8/1953 | Kreisler | 403/210 X |
| 2,827,680 | 3/1958 | Gibson | 403/210 X |
| 3,069,918 | 12/1962 | Schultz, Jr. | 403/359 X |

FOREIGN PATENT DOCUMENTS

| | | | |
|---|---|---|---|
| 548737 | 3/1977 | U.S.S.R. | 403/210 |
| 553377 | 4/1977 | U.S.S.R. | 403/210 |
| 558122 | 6/1977 | U.S.S.R. | 403/210 |

*Primary Examiner*—Charlie T. Moon
*Attorney, Agent, or Firm*—J. Winslow Young; H. Ross Workman; Allen R. Jensen

[57] ABSTRACT

A thimble insert for placement in a thimble eye of a cable, the thimble insert including a rigid body having a groove therein for engagement with the thimble and a slot for receipt of an anchor device engaged by the thimble eye. The body can be prepared with either a cylindrical or a tear drop profile and may be fabricated as a two-piece assembly.

8 Claims, 7 Drawing Figures

METHOD OF INHIBITING KINKING AND TWISTING OF A CABLE RELATIVE TO AN ANCHOR

This is a division, of application Ser. No. 007,455, filed Jan. 29, 1979, now abandoned.

BACKGROUND

1. Field of the Invention

This invention relates to cable attachments and, more particularly, to an insert for a cable thimble.

2. The Prior Art

Cables are referred to in the art as wire ropes and find wide application throughout the world in various applications where there is a requirement for transmitting tensile forces, providing stability or otherwise providing tension in a structural device. When used as a stabilizing member or in a guy wire configuration, any tendency for a cable toward elongation produces a detrimental effect on the object being stablized. For example, cable elongation in a sailboat, hang glider, antenna, tower or the like results in a corresponding degradation in structural integrity.

Cable attachment is by means of a loop interconnected with an anchor, or the like. Frequently, the loop is formed by bending the cable about a device known in the art as a thimble. The thimble is fabricated from a strip of metal formed with a semicircular cross section and bent longitudinally into a tear drop-like profile. The channel formed by the semicircular cross section faces outwardly and receives the cable engaged with the thimble. The cable is suitably swaged to lock the cable about the thimble thereby producing a thimble eye. Of course, prior to fabrication, the thimble eye is interconnected with the anchoring device. A thimble eye formed about a thimble provides a relatively compact loop of known dimensions. However, under conditions of stress the thimble is known to collapse and elongate slightly resulting in an elongation of the thimble eye. Elongation of any part of the cable results in a corresponding loss of trim to the overall structure. In sailboats, hang gliders and the like, this loss of trim is most undesirable and has been a source of dissatisfaction in the trade.

Additionally, for those devices that are frequently disassembled and reassembled, such as hang gliders, binding of thimble on tang in a misaligned position frequently occurs in the cable at the interconnection between the thimble eye and the tang. This binding or tangling results from the thimble eye being freely movable over a substantial portion of the tang and results in an undesirable degree of twisting and tangling of the cables. Cable twisting or kinking is particularly undesirable since a severe kink drastically reduces the tensile strength of the cable resulting in its required replacement.

One prior art technique for reducing the tendency for a cable to kink at the interconnection with the anchor has been to envelope the thimble eye and anchor in a length of heat-shrink plastic tubing followed by heating to shrink fit the plastic about the thimble eye and anchor interconnection. However, this technique does nothing to inhibit elongation of the thimble eye.

It would, therefore, be a significant advance in the art to provide an apparatus and method for inhibiting thimble elongation and cable tangling. It would also be an advancement in the art to provide a thimble insert which may be readily inserted into an existing thimble eye. Such an apparatus and method is disclosed and claimed herein.

BRIEF SUMMARY AND OBJECTS OF THE INVENTION

The present invention relates to a novel thimble insert apparatus and method, the thimble insert including a curvilinear body having a groove in the curvilinear profile. The dimensions of the body and the groove are such that a thimble is received within the groove and the body is retained within the thimble at the widest opening of the thimble. The body includes a laterally oriented slot having predetermined shape and dimensions for receiving therein the portion of the anchor or tang engaged by the thimble. The body impedes kinking of the cable relative to the tang while strengthening the thimble against collapse. The body is thus fabricated of a sufficiently rigid material such as a suitable plastic to thereby substantially inhibit a crushing of the thimble under stresses on the cable. The thimble insert is also readily adaptable to being fabricated as a two-piece insert for placement in an existing thimble eye.

It is, therefore, a primary object of this invention to provide improvements in inserts for thimbles.

It is another object of this invention to provide an improved method for inhibiting elogation of a thimble eye.

Another object of this invention is to provide a thimble insert for placement in the thimble eye upon assembly of the thimble eye.

Another object of this invention is to provide an insert for a thimble wherein the thimble eye has been previously assembled and the insert is placed in the thimble eye after assembly.

These and other objects and features of the present invention will become more fully apparent from the following description and appended claims taken in conjunction with the accompanying drawing.

DETAILED DESCRIPTION OF THE PREFERRED EMBODIMENTS

Figure 1:
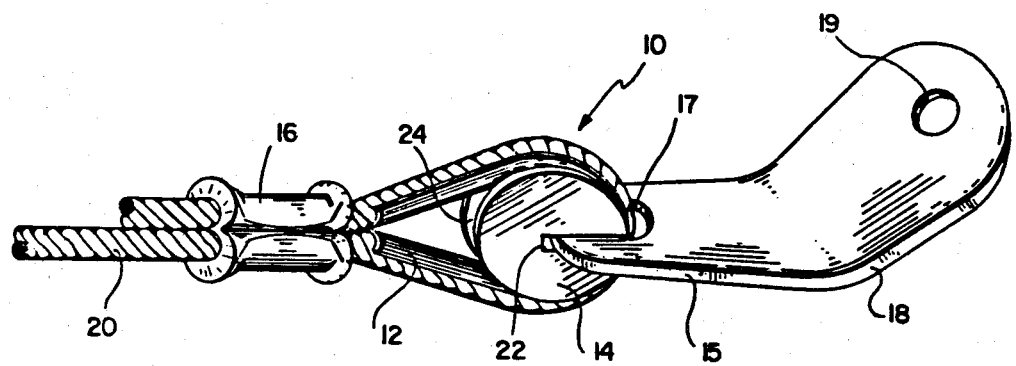
FIG. 1 is a perspective view of a first preferred embodiment of the thimble insert of this invention shown in the environment of a thimble eye and a tang.

The invention is best understood by reference to the drawing wherein like parts are designated with like numerals throughout.

Figure 2:
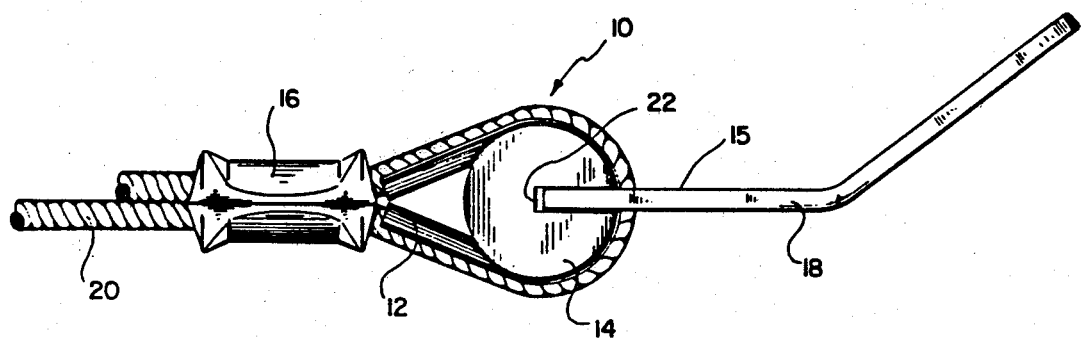
FIG. 2 is a side elevation of the apparatus shown in FIG. 1.

Referring now more particularly to FIGS. 1 and 2, an assembled thimble eye is shown generally at 10 and includes a thimble 12 encircled by a Cable 20 swaged by a swage 16. Thimble 12 and cable 20 pass through an aperture 17 in tang 15 of an anchor 18. A corresponding aperture 19 is adapted for suitably mounting anchor 18 to a second object (not shown.

A thimble insert 14 is retained by thimble eye 10. Thimble insert 14 includes a longitudinal slot 22 adapted to receive therein a portion of tang 15 while a circumferential groove 24 (FIG. 1) receives a portion of thimble 12 in nesting relationship therewith. Thimble insert 14 is shown with generally flat, circular sides having a diameter greater than the internal dimensions of thimble 12. In this manner, thimble insert 14 is securely retained within thimble 12 when thimble 12 is engaged by cable 22 and swaged thereabout with swage 16.

Assembly of thimble eye 10 about thimble insert 14 and in engagement with tang 15, is accomplished by spreading the two arms of thimble 12 and passing thimble 12 through aperture 17. Thereafter, thimble insert 14 is inserted between the arms of thimble 12 so that tang 15 is engaged within slot 22. Cable 20 is then passed through aperture 17 and secured within the channel of thimble 12. Thereafter, swage 16 is securely clamped over the ends of cable 20 completing the assembly of thimble eye 10.

Advantageously, stress placed upon cable 20 against anchor 18 with a force sufficient to cause an elongation of thimble 12 is effectively inhibited by the inclusion of thimble insert 14 within thimble eye 10. Furthermore, a tendency for thimble eye 10 to move freely about tang 15 is further inhibited by thimble insert 14 thereby minimizing the tendency for cable 12 and more particularly, thimble eye 10 to bind or kink relative to anchor 18.

Figure 3:
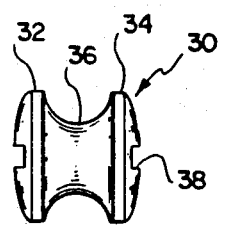
FIGS. 3-5 are a back, side and front view of a thimble insert, respectively.
Figure 4:
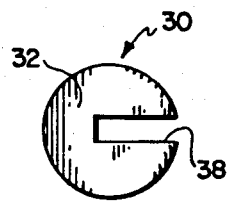
Figure 5:
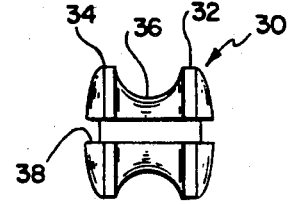

Referring now more particularly to FIGS. 3-5, a preferred embodiment of the thimble insert of this invention is generally at 30 having a spool-like configuration formed by rims 32 and 34 with a circumferential groove 36 therebetween. A longitudinal opening or slot 38 in thimble insert 30 acts as a tang or anchor-receiving opening for a tang such as tang 15 (FIGS. 1 and 2). Thimble insert 30 is shown with outwardly curvilinear or contoured faces, the outward extension of the faces beyond the periphery of slot 38 provide a pleasing aesthetic appearance to thimble insert 30 as well as additional lateral stability to thimble insert 30 when engaged about a tang (see tang 15, FIGS. 1 and 2). Advantageously, the various dimensions of thimble insert 30 may be selectively predetermined to coordinate the diameters of rims 32 and 34, the diameter and circumference of groove 36 as well as the width of slot 38 so as to selectively adapt thimble insert 30 to any predetermined thimble eye (such as thimble eye 10, FIGS. 1 and 2) and the corresponding anchor device (such as anchor 18, FIGS. 1 and 2.)

The particular embodiment illustrated in FIGS. 3-5, is directed for placement in a thimble (thimble 12, FIGS. 1 and 2) prior to assembly of the thimble eye (thimble eye 10, FIGS. 1 and 2). In this instance, thimble insert 30 is fabricated as a solid element from a suitable material such as a plastic, or the like, and thereafter inserted during assembly of the thimble eye as set forth hereinbefore.

Figure 6:
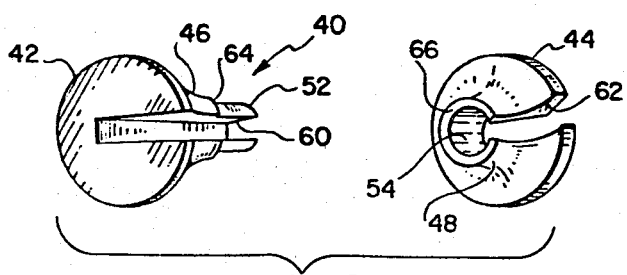
FIG. 6 is an exploded, perspective view of another preferred embodiment of a thimble insert of this invention.
Figure 7:
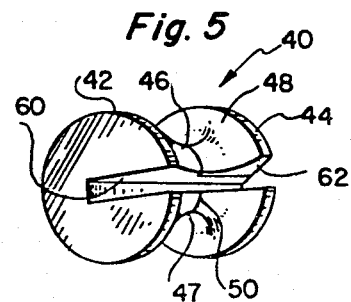
FIG. 7 is a perspective view of the assembled thimble insert of FIG. 6.

Referring now more particularly to FIGS. 6 and 7, a third preferred embodiment of the thimble insert of this invention is shown here generally as thimble insert 40 configured as a two-piece thimble insert. In particular, thimble insert 40 includes a male segment 42 and a matching, female segment 44. Male segment 42 includes a rim such as rim 32 (FIG. 3) and one-half of a groove face 46 terminating at the lower end thereof in an abutment face 64. A slot 60 is formed through male segment 42 and extends through a shaft 52.

Shaft 52 is received in a corresponding throughbore 54 in mating relationship therewith so that a semicircular face 66 correspondingly mates with face 64 forming a seam 50 in the bottom of the resulting groove 47 formed between half groove 46 and half groove 48. A cutout portion 62 in female segment 44 mates with and completes the slot 60 through the resulting thimble insert 40.

While it should be noted that shaft 52 is configurated with a circular external contour, shaft 52 and throughbore 54 is also selectively precontoured with a mating, non-circular cross section for the purpose of keying shaft 52 into throughbore 54 thereby selectively coordinating the orientation of cutout 62 with groove 60. A key 68 is formed on the surface of shaft 52 and mates with a corresponding keyway 69 formed in throughbore 54. Keying of shaft 52 into female segment 44 provides the additional advantage in that misalignment is avoided even though the engaged tang (tang 15, FIGS. 1 and 2) provides a certain degree of alignment during assembly.

Thimble insert 40 is specifically fabricated for the purpose of allowing assembly into a preassembled thimble eye. For example, with reference to FIGS. 1 and 2 in combination with FIGS. 6 and 7, male segment 42 would be inserted into thimble 12 with slot 60 receiving the corresponding end of tang 15. Thereafter, female segment 44 would be engaged over shaft 52 from the opposite face of thimble eye 10 so that cutout 62 would also slip over tang 15 until faces 64 and 66 were in abutment. Thereafter, a suitable glue (not shown) could be placed on the edge of throughbore 54 and allowed to penetrate and suitably coat the mating surfaces of throughbore 54 and shaft 52. Upon completion of the foregoing steps, thimble insert 40 is effectively identical to thimble insert 14 (FIGS. 1 and 2) and thimble insert 30 (FIGS. 3-5).

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a U.S. Letters Patent is:

1. A method for inhibiting kinking and twisting of a cable relative to an anchor secured to a cable thimble eye on the cable comprising:
   forming an insert for the cable thimble eye, the insert having a cylindrical body with an external diameter incrementally greater than the internal dimensions of the cable thimble eye and a circumferential, thimble-receiving groove in the body, the insert including a radial, anchor-engaging, rectangular slot extending the length of the body;
   obtaining a flat anchor having a thickness corresponding to the slot in the insert, the anchor having an aperture in the end thereof to receive the thimble and cable therethrough;
   snugly inserting the end of the anchor into the slot in the thimble insert with the aperture in the anchor positioned at the circumferential groove in the insert;
   inserting the thimble through the aperture and around the circumferential groove in the insert;
   passing an end of the cable through the aperture and around the thimble onto a portion of the cable; and securing the cable end to the cable thereby inhibiting kinking and twisting of the cable relative to the anchor.

2. The method defined in claim 1 wherein the forming step comprises fabricating the insert as mating halves, the halves joining along the center of the circumferential groove.

3. The method as defined in claim 2 wherein the securing step comprises joining the halves from each side of an assembled thimble eye and anchor.

4. A method for inhibiting elongation of a cable thimble when the cable is placed under tension and inhibiting relative kinking between the cable and an anchor when the tension is released comprising:
preparing a cable thimble insert by fabricating a cylindrical body having an external diameter and a length, the external diameter of the body being an incremental distance greater than the internal width of the cable thimble, forming a circumferential groove in the body to matingly receive therein an inner face of a portion of the thimble and cutting a rectangular radial slot into the body, the rectangular slot extending the length of the body and having a width selectively predetermined to engagedly receive the anchor;
obtaining a flat anchor having a thickness corresponding to the width of the slot so as to be snugly received in the slot, the anchor having an aperture in the end thereof to receive the thimble and cable therethrough;
snugly inserting the end of the anchor into the slot in the thimble insert with the aperture in the anchor positioned at the circumferential groove in the insert;
inserting the thimble through the aperture and around the circumferential groove in the insert;
passing an end of the cable through the aperture and around the thimble onto a portion of the cable; and
securing the cable end to the cable.

5. The method defined in claim 4 wherein the preparing step further comprises fabricating the body as a first segment and a second segment, the first segment being matingly engageable with the second segment along a line corresponding to the center of the circumferential groove.

6. The method defined in claim 5 wherein the fabricating step comprises forming a shaft extending from the first segment and a corresponding throughbore in the second segment, the throughbore matingly receiving the shaft.

7. The method defined in claim 6 wherein the forming step comprises preparing the slot along the shaft and extending the slot through the first body.

8. The method defined in claim 2 wherein the forming step further comprises preparing the shaft with a key and the throughbore with a corresponding keyway thereby keying the first segment to the second segment.

* * * * *

UNITED STATES PATENT AND TRADEMARK OFFICE
CERTIFICATE OF CORRECTION

PATENT NO. : 4,398,336
DATED : August 16, 1983
INVENTOR(S) : Donald R. Beuch

It is certified that error appears in the above—identified patent and that said Letters Patent is hereby corrected as shown below:

Column 2, line 66, "(not shown." should be --(not shown).--

Column 3, line 66, "througbore" should be --throughbore--

Column 6, line 27, (claime 8), "claim 2" should be --claim 6--

Signed and Sealed this

Twenty-second Day of November 1983

[SEAL]

Attest:

GERALD J. MOSSINGHOFF

Attesting Officer

Commissioner of Patents and Trademarks